United States Patent Office 3,637,905
Patented Jan. 25, 1972

3,637,905
HYDANTOIN-FORMALDEHYDE RESIN
MODIFIED POLYPROPYLENE
Patrick W. Ager, West Chester, Pa., assignor to
FMC Corporation, Philadelphia, Pa.
No Drawing. Filed Feb. 27, 1969, Ser. No. 803,092
Int. Cl. C08g 37/32; D06p 3/04
U.S. Cl. 260—854
9 Claims

ABSTRACT OF THE DISCLOSURE

Polypropylene compositions comprising a highly polymeric polypropylene resin containing a minor amount of a hydantoin-formaldehyde resin.

---

This invention relates to filament and film forming polypropylene compositions. More particularly, it relates to filament and film forming polypropylene compositions which can be readily dyed with disperse dyes.

It is known that highly polymeric polypropylene resins can be used to produce fibers and films which exhibit excellent chemical and physical properties and thus make them particularly useful for many purposes. However, it is similarly known that polypropylene cannot be dyed with disperse dyes with the utilization of normal techniques. Additionally, various attempts to improve the receptivity of polypropylene resin and fibers to disperse dyes by the addition of various resins and additives has not been successful in many instances due to the fact that many of these modifying resins and additives do not yield compatible blends with polypropylene. Such incompatibility results in polypropylene resin compositions which exhibits spotty or poor dyeability and generally low tensile strength, and hence such resin compositions are normally not suitable for commercial filament and film forming purposes.

It is therefore an object of the present invention to prepare polypropylene resin compositions which can be readily dyed with disperse dyes.

A further object of the present invention is to prepare polypropylene resin compositions which exhibit good dyeability and compatibility, thus making such a resin alloy suitable for filament and film forming purposes.

In accordance with the present invention, it has been determined that the above and related objects can be achieved with a polypropylene composition comprising a highly polymeric polypropylene resin containing a minor portion of a hydantoin-formaldehyde resin.

The present polypropylene compositions or alloys not only result in compositions which are dyeable with disperse dyes but also result in compositions which are quite compatible. Therefore, resins and filaments formed from the subject polypropylene alloys exhibit good tensile strength.

The polypropylene resin used to prepare the present alloy compositions can be any one of those which are commercially available and which are suitable for filament and film forming purposes. Normally, a stabilized polypropylene having a density of about 0.90 to 0.92 is used. Such polypropylene resins are stabilized against ultraviolet light and heat and are principally isotactic in structure.

The hydantoin-formaldehyde resins, which are used in accordance with the present invention to modify polypropylene can be any of those coming within the purview of the hydantoin-formaldehyde resins disclosed and claimed in U.S. Pat. 2,155,863, issued Apr. 25, 1939. The entire disclosure of U.S. Pat. 2,155,863 is hereby incorporated herein by reference. U.S. Pat. 2,155,863 discloses hydantoin-formaldehyde resins and substituted hydantoin-formaldehyde resins and the process of preparing same. Among the substituted hydantoin-formaldehyde resins disclosed in U.S. Pat. 2,155,863 are 5,5-dialkyl substituted hydantoin-formaldehyde resins such as 5,5-dimethy hydantoin-formaldehyde resin. The subject patent also discloses the compound phenol-hydantoin-formaldehyde resin and phenol-5,5-dialkyl substituted hydantoin-formaldehyde resin. Claim 1 in U.S. Pat. 2,155,863 is most descriptive of the invention contained therein and is as follows:

Claim 1: As a new composition a hydantoin-formaldehyde resin. Any of the hydantoin-formaldehyde resins disclosed in U.S. 2,155,863 can be used to modify polypropylene resin in accordance with the present invention to achieve the desired result. One hydantoin-formaldehyde resin commercially available and coming within the above description is marketed under the designation Dantoin 684 by Glyco Chemicals, Inc., New York, N.Y. Dantoin 684 is dimethyl hydantoin-formaldehyde resin having a molecular weight of 240–300 and a density of 1.30 g./ml.

The amount of hydantoin-formaldehyde resin which is blended or alloyed with polypropylene resin according to the present invention to achieve the desired results may be varied over a rather large range. In general, it has been determined that the dyeability of polypropylene resin and filaments formed therefrom with disperse dyes can be noticeably improved so as to be commercially acceptable with the addition or blending of as little as 2 percent of the above-described hydantoin-formaldehyde resins based on the combined total weight of the resin blend or alloy. Generally, for most requirements, it is not necessary to incorporate more than 20 percent of the said hydantoin-formaldehyde resins. However, in most instances, in view of relative depth of dyeability and physical properties of the filament and film products formed from such resin alloys, it is preferred to use polypropylene compositions of the present invention which contain from about 3 to 15 percent, based on the combined total resin blend, of a hydantoin-formaldehyde resin.

The subject compositions or resin blends can be prepared by any convenient and conventional method wherein the two resin components are uniformly blended, for example, the polypropylene and hydantoin-formaldehyde resins can be dry blended at room temperature and then the resulting uniform blend can be melt extruded into the desired product. Alternatively, the subject resin components can also be blended together at elevated temperatures on suitable rolls, in a Banbury mixer, or with other suitable type processing equipment wherein a uniform intimate blend of the resins can be readily obtained before they are introduced into extrusion apparatus for the forming of the desired product forms.

It may also be desirable to add to the subject compositions various additives. For example, the end use of the product may indicate that various stabilizers, delustrants and other conventionally used additives are required. In this case, such additives can be incorporated into the subject polymer blend during the blending cycle wherein the polymer components either at room or elevated temperatures.

The polymeric polypropylene-hydantoin-formaldehyde resin blends of the present invention can be readily spun into filaments or films by conventional spinning techniques. For example, the subject compositions can be melt spun into filaments which can then be stretched to develop the desired tensile strength in the fibers.

The following example will further illustrate a preferred embodiment of the present invention.

EXAMPLE 28.5 pounds of a stabilized polypropylenes resin and 1.5 pounds of dimethyl hydantoin-formaldehyde resin (mole weight—240 to 300) were blended in a drum tumbler for 30 minutes. Then the blend of polypropylene and dimethyl hydantoin-formaldehyde resin was spun in a one inch extruder using a medium compression ratio polyolefin type screw at a temperature at about 250° C. The spun yarn was drawn at a draw ratio of about 3.5:1 to give a final spun denier product of 250 for 34 filaments. This yarn was further drawn and processed to produce a final yarn having a denier of approximately 70 for 34 filaments. Then this yarn was made into skeins. These skeins were then dyed in a dye bath containing 2 percent Polynal Red B.C. disperse dye, based on the weight of the skeins. The skeins were immersed in the dye bath at 212° F. for one hour.

After the one hour immersion, the above skeins were dried and they were noted to have obtained a deep red color.

A control skein prepared from unmodified polypropylene resin (not alloyed) under the same conditions as above was prepared and subjected to the above described dyeing procedure. This skein after one hour immersion exhibited no visible dye pick-up.

The above results indicate that yarns made from the subject resin blends or alloys in accordance with the present invention are readily dyeable with disperse dyes. Therefore, in view of their other excellent physical and chemical properties, such yarns are particularly suitable for various commercial usages.

The present invention has been described in detail with particular reference to several preferred embodiments but it will be understood that many variations and modifications can be achieved within the teaching and scope of this invention as herein described. Therefore, the subject invention is not to be limited except as defined in the appended claims.

I claim:

1. A composition of matter comprising a polypropylene resin containing a minor amount of a hydantoin-formaldehyde resin prepared by reacting reactants consisting essentially of formaldehyde and a hydantoin.

2. A composition of claim 1 wherein the hydantoin-formaldehyde resin is a dimethylhydantoin-formaldehyde resin having an average molecular weight of 240 to 300.

3. Composition of claim 1 comprised of about 80 to 98 percent of highly polymeric polypropylene resin and from about 2 to 20 percent of the hydantoin-formaldehyde resin.

4. A polypropylene alloy fiber exhibiting affinity for disperse dyes, said fiber containing a minor amount of a hydantoin-formaldehyde resin prepared by reacting reactants consisting essentially of formaldehyde and a hydantoin.

5. A composition of claim 4 wherein the hydantoin-formaldehyde resin is a dimethyl hydantoin-formaldehyde resin having an average molecular weight of 240 to 300.

6. An article of claim 5 wherein the dimethyl hydantoin-formaldehyde resin is present in a concentration of from 2 to 20 percent based on the total weight of the article.

7. A film formed from a composition of matter as defined by claim 1.

8. A film formed from a composition of matter as defined by claim 2.

9. A fiber formed from a composition of matter as defined by claim 2.

References Cited

UNITED STATES PATENTS

| | | | |
|---|---|---|---|
| 3,236,918 | 2/1966 | Tsunoda et al. | 260—897 |
| 3,296,208 | 1/1967 | Rogers | 260—67.5 |
| 3,308,206 | 3/1967 | Fordemwalt | 260—854 |
| 3,412,036 | 11/1968 | McIntosh | 260—854 |

JOHN C. BLEUTGE, Primary Examiner

U.S. Cl. X.R.

8—4, 162 R, Digest 9; 260—Digest 34; 264—78

UNITED STATES PATENT OFFICE
CERTIFICATE OF CORRECTION

Patent No. 3,637,905      Dated January 25, 1972

Inventor(s) Patrick W. Ager

It is certified that error appears in the above-identified patent and that said Letters Patent are hereby corrected as shown below:

Col. 2, line 4, "methy" should read -- methyl --; line 71, "polypropylenes" should read -- polypropylene --. Col. 4, line 13, "A composition" should read -- An article --.

Signed and sealed this 6th day of June 1972.

(SEAL)
Attest:

EDWARD M. FLETCHER, JR.
Attesting Officer

ROBERT GOTTSCHALK
Commissioner of Patents